(12) United States Patent
Burkhardt et al.

(10) Patent No.: US 8,412,437 B2
(45) Date of Patent: Apr. 2, 2013

(54) METHOD AND DEVICE FOR OPERATING AN INTERNAL COMBUSTION ENGINE

(75) Inventors: Thomas Burkhardt, Neutraubling (DE); Jürgen Dingl, Regensburg (DE); Andreas Hofmann, Falkenfels (DE)

(73) Assignee: Continental Automotive GmbH, Hannover (DE)

( * ) Notice: Subject to any disclaimer, the term of this patent is extended or adjusted under 35 U.S.C. 154(b) by 800 days.

(21) Appl. No.: 12/601,213

(22) PCT Filed: May 20, 2008

(86) PCT No.: PCT/EP2008/056150
§ 371 (c)(1),
(2), (4) Date: Nov. 20, 2009

(87) PCT Pub. No.: WO2008/142065
PCT Pub. Date: Nov. 27, 2008

(65) Prior Publication Data
US 2010/0185379 A1     Jul. 22, 2010

(30) Foreign Application Priority Data

May 23, 2007 (DE) .......................... 10 2007 023 850

(51) Int. Cl.
*B60T 7/12* (2006.01)
*G05D 1/00* (2006.01)
*G06F 7/00* (2006.01)
*G06F 17/00* (2006.01)

(52) U.S. Cl. ...................................... 701/103

(58) Field of Classification Search .................. 701/101, 701/102, 103, 104, 106, 110, 115; 73/114.21–114.33; 703/182
See application file for complete search history.

(56) References Cited

U.S. PATENT DOCUMENTS 5,228,336 A * 7/1993 Nagaishi ..................... 73/114.32
5,974,870 A * 11/1999 Treinies et al. ............. 73/114.33
(Continued)

FOREIGN PATENT DOCUMENTS

DE     10241888     3/2004
DE     10332608     5/2005
(Continued)

OTHER PUBLICATIONS

German Office Action for Application No. 10 2007 023 850.0 (3 pages), Jan. 30, 2008.
(Continued)

*Primary Examiner* — Stephen K Cronin
*Assistant Examiner* — Sizo Vilakazi
(74) *Attorney, Agent, or Firm* — King & Spalding L.L.P.

(57) ABSTRACT

Actual values of a load variable are detected by a sensor during active model trimming under different valve pressure conditions, and a model of estimated values is created. Trimming values of a model parameter are determined depending on detected and modeled values such that when the model parameter is trimmed, the modeled values approximate the detected values. A function is determined depending on the different pressure conditions and approximated to the trimming values. At different pressure conditions first lambda control values are detected. A first controller value fitted function is determined depending on the pressure conditions and approximated. When the model trimming mode is not active, second lambda control values are detected at different pressure conditions. A second controller value fitted function is determined depending on the pressure conditions and is approximated. An error of the intake system is detected depending on the fitted functions.

20 Claims, 7 Drawing Sheets

U.S. PATENT DOCUMENTS

| | | | |
|---|---|---|---|
| 6,122,589 A | 9/2000 | Yamaguchi et al. | 701/106 |
| 6,415,273 B1 | 7/2002 | Fujime | 706/16 |
| 6,985,806 B2 | 1/2006 | Stadler | 701/102 |
| 7,209,824 B2 * | 4/2007 | Henn et al. | 701/103 |
| 7,477,980 B2 * | 1/2009 | Kraemer et al. | 701/102 |
| 2010/0185379 A1 * | 7/2010 | Burkhardt et al. | 701/103 |

FOREIGN PATENT DOCUMENTS

| | | |
|---|---|---|
| DE | 102004011236 | 9/2005 |
| DE | 102005019807 | 11/2006 |
| EP | 0886725 | 8/1999 |
| EP | 0936351 | 8/1999 |
| EP | 0950805 | 10/1999 |
| EP | 1398486 | 3/2004 |
| EP | 1362173 | 7/2004 |

OTHER PUBLICATIONS

International Search Report and Written Opinion for Application No. PCT/EP2008/056150 (11 pages), Oct. 21, 2008.

van Busshuysen et al., "Handbuch Verbrennungsmotor". 2. Auflage 2002, Vieweg Verlag, ISBN 3-528-13933-1, S 557-558 (8 pages), Jun. 1, 2002.

\* cited by examiner

| | M_T | YT | YT_MOD | M_R1 | YR1 | YR1_MOD | M_R2 | YR2 | YR2_MOD |
|---|---|---|---|---|---|---|---|---|---|
| >0 | | × | | | | | | × | |
| ≈0 | | | × | × | × | × | | | × |
| <0 | × | | | | | | × | | |

| | M_T | YT | YT_MOD | M_R1 | YR1 | YR1_MOD | M_R2 | YR2 | YR2_MOD |
|---|---|---|---|---|---|---|---|---|---|
| >0 | × | | | | | | × | | |
| ≈0 | | | × | × | × | × | | | × |
| <0 | | × | | | | | | × | |

| | M_T | YT | YT_MOD | M_R1 | YR1 | YR1_MOD | M_R2 | YR2 | YR2_MOD |
|---|---|---|---|---|---|---|---|---|---|
| >0 | × | × | × | | | | × | × | × |
| ≈0 | | | | × | × | × | | | |
| <0 | | | | | | | | | |

| | M_T | YT | YT_MOD | M_R1 | YR1 | YR1_MOD | M_R2 | YR2 | YR2_MOD |
|---|---|---|---|---|---|---|---|---|---|
| >0 | × | | × | | | | | | |
| ≈0 | | × | | × | × | × | | × | |
| <0 | | | | | | | × | | × |

| | M_T | YT | YT_MOD | M_R1 | YR1 | YR1_MOD | M_R2 | YR2 | YR2_MOD |
|---|---|---|---|---|---|---|---|---|---|
| >0 | | × | | | | | | × | |
| ≈0 | | | × | × | × | × | | | × |
| <0 | × | | | | | | × | | |

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2008/056150 filed May 20, 2008, which designates the United States of America, and claims priority to German Application No. 10 2007 023 850.0 filed May 23, 2007, the contents of which are hereby incorporated by reference in their entirety.

TECHNICAL FIELD

The invention relates to a method and device for operating an internal combustion engine. The internal combustion engine comprises an intake system and an exhaust gas system, which communicate with a combustion chamber of the internal combustion engine as a function of the switching position of a gas inlet valve or a gas outlet valve. The intake system comprises at least an intake manifold and a throttle valve and a load sensor. The exhaust gas system comprises at least a lambda probe.

BACKGROUND

The automobile industry is under increasing pressure to configure motor vehicles so that they can identify malfunctions and/or defective vehicle components very precisely themselves. This is particularly important for malfunctions and/or defective components which affect the safety of occupants of the motor vehicle and/or pollutant emissions of the motor vehicle. Full diagnostic capacity of an exhaust gas system and/or an intake system of an internal combustion engine of a motor vehicle may be required for example. In particular the monitoring of vehicle components, which influence exhaust gas formation and/or pollutant emissions is regularly required.

SUMMARY

According to various embodiments, a method and device for operating an internal combustion engine can be created, which allow(s) the determination of a defective element of an intake system of the internal combustion engine.

According to an embodiment, a method for operating an internal combustion engine, comprising an intake system and an exhaust gas system, which communicate with a combustion chamber of the internal combustion engine as a function of the switching position of a gas inlet valve or gas outlet valve, wherein the intake system comprises at least an intake manifold and a throttle valve and a load sensor and the exhaust gas system comprising at least a lambda probe, may comprise the steps of:
when intake manifold model trimming is active:—actual values of a load variable are detected by means of the load sensor at different stationary throttle valve pressure ratios, which are representative of a difference between an intake manifold pressure upstream of the throttle valve and downstream of the throttle valve and estimated values of the load variable are also modeled based on an intake manifold model,—trimming values of at least one model parameter of the intake manifold model are determined as a function of the detected actual values and the modeled estimated values of the load variable in such a manner that when the corresponding model parameter is trimmed as a function of the trimming values the modeled estimated values of the load variable approximate to the corresponding detected actual values of the load variable,—a trimming value best-fit function is determined as a function of the different throttle valve pressure ratios and is approximated by the trimming values,—first controller values of first controller deflections of a lambda controller are detected at different stationary throttle valve pressure ratios,—a first controller value best-fit function is determined as a function of the throttle valve pressure ratios, which is approximated by the first controller values,
when intake manifold model trimming is inactive:—second controller values of second controller deflections of the lambda controller are detected at different stationary throttle valve pressure ratios,—a second controller value best-fit function is determined as a function of the throttle valve pressure ratios, which is approximated by the second controller values, and
an error in the intake system is identified as a function of the best-fit functions.

According to a further embodiment, the trimming value best-fit function may comprise a trimming value best-fit line and/or wherein the first controller value best-fit function comprises a first controller value best-fit line and/or wherein the second controller value best-fit function comprises a second controller value best-fit line. According to a further embodiment,—the trimming value best-fit line can be determined by a trimming value gradient and a trimming Y axis segment, and/or—the first controller value best-fit line can be determined by a first controller value gradient and a first controller value Y axis segment, and/or—the second controller value best-fit line can be determined by a second controller value gradient and a second controller value Y axis segment and/or—the error in the intake system can be identified as a function of the trimming value gradient, the trimming Y axis segment, the first controller value gradient, the first controller value Y axis segment, the second controller value gradient and/or the second controller value Y axis segment. According to a further embodiment,—a modified trimming Y axis segment can be determined as a function of the trimming value gradient and the trimming Y axis segment, and/or—a modified first controller value Y axis segment can be determined as a function of the first controller value gradient and the first controller value Y axis segment, and/or—a modified second controller value Y axis segment can be determined as a function of the second controller value gradient and the second controller value Y axis segment, and—the error in the intake system is identified as a function of the trimming value gradient, the trimming Y axis segment, the modified trimming Y axis segment, the first controller value gradient, the first controller value Y axis segment, the modified first controller value Y axis segment, the second controller value gradient, the second controller value Y axis segment and/or the modified second controller value Y axis segment. According to a further embodiment,—the trimming values of the load variable can be monitored by comparing the trimming values with a predetermined threshold trimming value,—intake manifold model trimming can be deactivated and the second controller values of the second controller deflections of the lambda controller are determined, if at least one of the trimming values is greater than the predetermined threshold trimming value. According to a further embodiment, the load variable can be an air mass flow upstream of the throttle valve. According to a further embodiment, an error in an air mass flow sensor provided to detect an actual value of the air mass flow can be identified if—the gradients of the best-fit lines are approximately zero, the trimming Y axis segments are greater than zero, the first controller value Y axis segments are smaller than zero and the second controller value Y axis segments are approximately zero, or—the trimming value gradient is smaller than zero, the trimming Y axis segments are greater than zero, the first controller value gradient is greater than zero, the first controller value Y axis segments are smaller than zero, the second controller value gradient is approximately zero and the second controller value Y axis segments are approximately zero, or—the gradients of the best-fit lines are approximately zero, the trimming Y axis segments are smaller than zero, the first controller value Y axis segments are greater than zero and the second controller value Y axis segments are approximately zero, or—the trimming value gradient is greater than zero, the trimming Y axis segments are smaller than zero, the first controller value gradient is smaller than zero, the first controller value Y axis segments are greater than zero, the second controller value gradient is approximately zero and the second controller value Y axis segments are approximately zero. According to a further embodiment, an error in the throttle valve can be identified, if—the trimming value gradient is smaller than zero, the trimming Y axis segment is greater than zero, the modified trimming Y axis segment is approximately zero, the first controller value gradient and the first controller value Y axis segments are approximately zero, the second controller value gradient is smaller than zero, the second controller value Y axis segment is greater than zero and the modified second controller value Y axis segment is approximately zero,—the trimming value gradient is greater than zero, the trimming Y axis segment is smaller than zero, the modified trimming Y axis segment is approximately zero, the first controller value gradient and the first controller value Y axis segments are approximately zero, the second controller value gradient is greater than zero, the second controller value Y axis segment is smaller than zero and the modified second controller value Y axis segment is approximately zero. According to a further embodiment, a leak in the intake system can be identified, if the trimming value gradient is greater than zero, the trimming Y axis segment is smaller than zero, the modified trimming Y axis segment is approximately zero, the first controller value gradient is smaller than zero, the first controller value Y axis segment is greater than zero, the modified first controller value Y axis segment is approximately zero, the second controller value gradient is smaller than zero, the second controller value Y axis segment is greater than zero and the modified second controller value Y axis segment is approximately zero. According to a further embodiment, an error can be identified in an ambient pressure sensor, as a function of the measurement value of which the throttle valve pressure ratios are determined, if—the trimming value gradient and the trimming Y axis segments are smaller than zero, the first controller value gradient and the first controller value Y axis segments are approximately zero and the second controller value gradient and the second controller value Y axis segments are smaller than zero, or—the trimming value gradient and the trimming Y axis segments are greater than zero, the first controller value gradient and the first controller value Y axis segments are approximately zero and the second controller value gradient and the second controller value Y axis segments are greater than zero.

According to a further embodiment, a defective air filter of the intake system can be identified, if—the trimming value gradient is greater than zero, the trimming Y axis segment is approximately zero and the modified trimming Y axis segment is greater than zero, the first controller value gradient and the first controller value Y axis segments are approximately zero, the second controller value gradient is smaller than zero, the second controller value Y axis segment is approximately zero and the modified second controller value Y axis segment is smaller than zero, or—the trimming value gradient is smaller than zero, the trimming Y axis segment is greater than zero and the modified trimming Y axis segment is approximately zero, the first controller value gradient and the first controller value Y axis segments are approximately zero, the second controller value gradient is smaller than zero, the second controller value Y axis segment is greater than zero and the modified second controller value Y axis segment is approximately zero. According to a further embodiment, the load variable can be an intake manifold pressure in the intake manifold.

According to another embodiment, a device for operating an internal combustion engine may comprise an intake system and an exhaust gas system, which communicate with a combustion chamber of the internal combustion engine as a function of the switching position of a gas inlet valve or a gas outlet valve, wherein the intake system comprises at least an intake manifold and a throttle valve and a load sensor and the exhaust gas system comprising at least a lambda probe, the device being configured—when intake manifold model trimming is active:—to detect actual values of a load variable by means of the load sensor at different stationary throttle valve pressure ratios, which are representative of a difference between an intake manifold pressure upstream of the throttle valve and downstream of the throttle valve and to model estimated values based on an intake manifold model,—to determine trimming values of at least one model parameter of the intake manifold model as a function of the detected actual values and the modeled estimated values of the load variable in such a manner that when the corresponding model parameter is trimmed as a function of the trimming values the modeled estimated values of the load variable approximate to the corresponding detected actual values of the load variable,—to determine a trimming value best-fit function as a function of the different throttle valve pressure ratios, which is approximated by the trimming values,—to detect first controller values of first controller deflections of a lambda controller at different stationary throttle valve pressure ratios,—to determine a first controller value best-fit function as a function of the throttle valve pressure ratios, which is approximated by the first controller values, when intake manifold model trimming is inactive:—to detect second controller values of second controller deflections of the lambda controller at different stationary throttle valve pressure ratios,—to determine a second controller value best-fit function as a function of the throttle valve pressure ratios, which is approximated by the second controller values, and to identify an error in the intake system as a function of the best-fit functions.

BRIEF DESCRIPTION OF THE DRAWINGS

Exemplary embodiments are described in more detail below with reference to schematic drawings, in which.

Elements with the same structure and function are marked with the same reference characters in all the figures.

DETAILED DESCRIPTION

Figure 1:
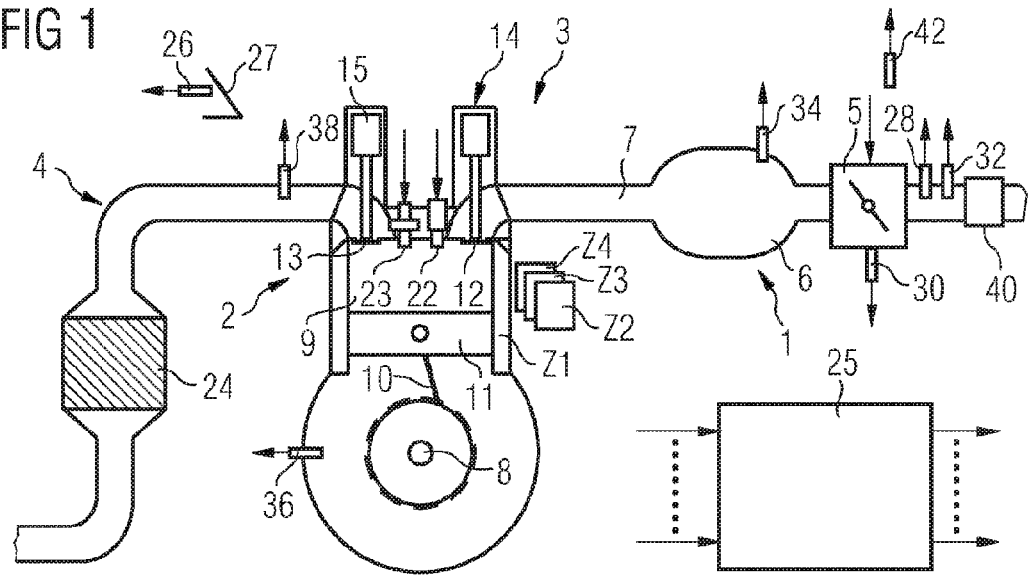
FIG. 1 shows an internal combustion engine.

According to various embodiments, in a method and device for operating an internal combustion engine, the internal combustion engine comprises an intake system and an exhaust gas system, which communicate with a combustion chamber of the internal combustion engine as a function of the switching position of a gas inlet valve or a gas outlet valve. The intake system comprises at least an intake manifold and a throttle valve and a load sensor. The exhaust gas system comprises at least a lambda probe. To operate the internal combustion engine actual values of a load variable are detected by means of a load sensor at different stationary throttle valve pressure ratios when intake manifold model trimming is active. The throttle valve pressure ratios are representative of a difference between an intake manifold pressure upstream of the throttle valve and downstream of the throttle valve. Estimated values of the load variable are also modeled based on an intake manifold model. Trimming values of at least one model parameter of the intake manifold model are determined as a function of the detected actual values and the modeled estimated values of the load variable in such a manner that when the corresponding model parameter is trimmed as a function of the trimming values the modeled estimated values of the load variable approximate to the corresponding detected actual values of the load variable. A trimming value best-fit function is determined as a function of the different throttle valve pressure ratios. The trimming value best-fit function is approximated by the trimming values. First controller values of first controller deflections of a lambda controller are also detected at different stationary throttle valve pressure ratios. A first controller value best-fit function is determined as a function of the throttle valve pressure ratios. The controller value best-fit function is approximated by the first controller values. When intake manifold model trimming is inactive, second controller values of second controller deflections of the lambda controller are detected at different stationary throttle valve pressure ratios. A second controller value best-fit function is determined as a function of the throttle valve pressure ratios. The second controller value best-fit function is approximated by the second controller values. An error in the intake system is identified as a function of the best-fit functions. The load sensor is for example an air mass flow sensor or an intake manifold pressure sensor. A positive controller value preferably signifies an increase in a fuel mass to be metered in relative to a fuel mass precontrol following from an intake manifold fill model.

Determination of the best-fit functions allows full diagnostic capacity for the intake system of the internal combustion engine. In this context full diagnostic capacity means that the functionality of all the components of the intake system can be verified. In particular it allows verification of an air filter upstream of the throttle valve, the throttle valve, a load sensor, a leak in the intake system upstream of the throttle valve and/or downstream of the throttle valve and/or an ambient pressure sensor. Also when verifying said sensors, it is even possible to identify an error type. The error type is for example a constant or relative positive or negative sensor deviation.

The intake manifold model allows different pressures in the intake system and/or an air mass in the intake system and/or an air mass flow into the intake system and/or toward the combustion chamber of the internal combustion engine to be determined as a function of the position of the throttle valve. When intake manifold model trimming is active, at least one model parameter of the intake manifold model is trimmed in such a manner that the estimated value of the load variable approximates to the actual value of the load variable. The model parameters are for example a reduced cross-sectional surface of the throttle valve, in particular at low load, or a pressure upstream of the throttle valve, in particular at high load. Trimming of the model parameter in this context signifies an adjustment of the model parameter.

In one embodiment the trimming value best-fit function comprises a trimming value best-fit line and/or the first controller value best-fit function comprises a first controller value best-fit line and/or the second controller value best-fit function comprises a second controller value best-fit line. This allows the defective component of the intake system to be determined particularly simply as a function of the best-fit functions. Alternatively a higher-order best-fit function can be determined, for example a hyperbola or a parabola.

In a further embodiment the trimming value best-fit line is determined by a trimming value gradient and a trimming Y axis segment. The first controller value best-fit line is determined by a first controller value gradient and a first controller value Y axis segment. The second controller value best-fit line is determined by a second controller value gradient and a second controller value Y axis segment. The error in the intake system is identified as a function of the trimming value gradient, the trimming Y axis segment, the first controller value gradient, the first controller value Y axis segment, the second controller value gradient and the second controller value Y axis segment. This allows the gradients and y axis segments to be written into a predetermined regression line parameter matrix, in the columns of which the gradients and Y axis segments are input for example and in the rows of which it is indicated whether the corresponding variable in the columns is greater than, smaller than or approximately equal to zero, so that the defective component of the intake system can be identified quickly and simply based on the resulting pattern within the regression line parameter matrix.

In a further embodiment a modified trimming value Y axis segment is determined as a function of the trimming value gradient and the trimming Y axis segment. Alternatively or additionally a modified first controller value Y axis segment is determined as a function of the first controller value gradient and the first controller value Y axis segment. Alternatively or additionally a modified second controller value Y axis segment is determined as a function of the second controller value gradient and the second controller value Y axis segment. The error in the intake system is identified as a function of the trimming value gradient, the trimming Y axis segment, the modified trimming Y axis segment, the first controller value gradient, the first controller value Y axis segment, the modified first controller value Y axis segment, the second controller value gradient, the second controller value Y axis segment and/or the modified second controller value Y axis segment. This helps the defective component to be identified particularly precisely with a high level of reliability. The modified controller value Y axis segments are preferably obtained by displacing the Y axis along the X axis, so that the Y axis intersects the X axis at one.

In a further embodiment the trimming values of the load variable are monitored by comparing the trimming values with a predetermined threshold trimming value. Intake manifold model trimming is deactivated and the second controller values of the second controller deflections of the lambda controller are determined, if at least one of the trimming values is greater than the predetermined threshold trimming value. This helps the trimming value best-fit function and the first controller value best-fit function to be known when intake manifold trimming is active during regular operation of the internal combustion engine and only the second controller value best-fit function has to be determined after deactivation of intake manifold model trimming, which is an index of a defective component of the intake system, so that only the second controller value best-fit function has to be determined particularly quickly after deactivation of intake manifold model trimming. This helps the defective component of the intake system to be determined particularly quickly.

Data for the creation of the best-fit functions is preferably collected regularly during operation of the internal combustion engine. The data is analyzed when the internal combustion engine is to be turned off and/or when a sufficient quantity of data has been collected to analyze the best-fit functions.

In a further embodiment the load variable is an air mass flow upstream of the throttle valve. This can help advantageously to determine the error in the intake system.

In a further embodiment an error in an air mass flow sensor provided to detect an actual value of the air mass flow is determined if the gradients of the best-fit lines are approximately zero, the trimming Y axis segments are greater than zero, the first controller value Y axis segments are smaller than zero and the second controller value Y axis segments are approximately zero. Alternatively or additionally the error in the air mass flow sensor is identified if the trimming value gradient is smaller than zero, the trimming Y axis segments are greater than zero, the first controller value gradient is greater than zero, the first controller value Y axis segments are smaller than zero, the second controller value gradient and the second controller value Y axis segments are approximately zero. Alternatively or additionally an error in the air mass flow sensor is identified if the gradients of the best-fit lines are approximately zero, the trimming Y axis segments are smaller than zero, the first controller value Y axis segments are greater than zero and the second controller value Y axis segments are approximately zero. Alternatively or additionally an error in the air mass flow sensor is identified if the trimming value gradient is greater than zero, the trimming Y axis segment is smaller than zero, the first controller value gradient is smaller than zero, the first controller value Y axis segments are greater than zero, the second controller value gradient and the second controller value Y axis segments are approximately zero. This helps the error in the air mass flow sensor to be identified particularly reliably. The error in the air mass flow sensor can be identified even more precisely as a function of the different alternatives for identifying the error in the air mass flow sensor. In particular it can be identified whether the air mass flow sensor indicates too much or too little and whether it is a relative or absolute deviation as a function of the throttle valve pressure ratio.

In a further embodiment an error in the throttle valve is identified, if the trimming value gradient is smaller than zero, the trimming Y axis segment is greater than zero, the modified trimming Y axis segment is approximately zero, the first controller value gradient and the first controller value Y axis segments are approximately zero, the second controller value gradient is smaller than zero, the second controller value Y axis segment is greater than zero and the modified second controller value Y axis segment is approximately zero. Alternatively or additionally the error in the throttle valve is identified, if the trimming value gradient is greater than zero, the trimming Y axis segment is smaller than zero, the modified trimming Y axis segment is approximately zero, the first controller value gradient and the first controller value Y axis segments are approximately zero, the second controller value gradient is greater than zero, the second controller value Y axis segment is smaller than zero and the modified second controller value Y axis segment is approximately zero. This helps the error in the throttle valve to be identified particularly reliably. The two different alternatives for identifying the error in the throttle valve allow the error in the throttle valve to be identified even more precisely. In particular it can be identified whether a degree of opening of the throttle valve is greater or smaller than that detected by a throttle valve position sensor and whether the deviation in the degree of opening in relation to the throttle valve pressure ratios is a relative or absolute deviation.

In a further embodiment a leak in the intake system is identified if the trimming value gradient is greater than zero, the trimming Y axis segment is smaller than zero, the modified trimming Y axis segment is approximately zero, the first controller value gradient is smaller than zero, the first controller value Y axis segment is greater than zero, the modified first controller value Y axis segment is approximately zero, the second controller value gradient is smaller than zero, the second controller value Y axis segment is greater than zero and the modified second controller value Y axis segment is approximately zero. This helps the leak in the intake system to be identified particularly precisely. It can also be distinguished as a function of the amount of the gradients of the best-fit lines whether the leak in the intake system is upstream or downstream of the throttle valve.

In a further embodiment an error is identified in an ambient pressure sensor of the internal combustion engine, as a function of the measurement value of which the throttle valve pressure ratios are determined, if the trimming value gradient and the trimming Y axis segments are smaller than zero, the first controller value gradient and the first controller value Y axis segments are approximately zero and the second controller value gradient and the second controller value Y axis segments are smaller than zero. Alternatively or additionally an error is identified in the ambient pressure sensor, if the trimming value gradient and the trimming Y axis segments are greater than zero, the first controller value gradient and the first controller value Y axis segments are approximately zero and the second controller value gradient and the second controller value Y axis segments are greater than zero. This helps the error in the ambient pressure sensor to be identified particularly precisely. The two different alternatives allow it to be distinguished whether the ambient pressure sensor indicates too much or too little.

In a further embodiment a defective air filter of the intake system is identified, if the trimming value gradient is greater than zero, the trimming Y axis segment is approximately zero and the modified trimming Y axis segment is greater than zero, the first controller value gradient and the first controller value Y axis segments are approximately zero, the second controller value gradient is smaller than zero, the second controller value Y axis segment is approximately zero and the modified second controller value Y axis segment is smaller than zero. Alternatively or additionally the defective air filter of the intake system is identified if the trimming value gradient is smaller than zero, the trimming Y axis segment is greater than zero and the modified trimming Y axis segment is approximately zero, the first controller value gradient and the first controller value Y axis segments are approximately zero, the second controller value gradient is smaller than zero, the second controller value Y axis segment is greater than zero and the modified second controller value Y axis segment is approximately zero. This helps the defective air filter to be identified particularly precisely. The two different alternatives for identifying the defective air filter allow the defective air filter to be identified if an ambient pressure sensor is present, the measurement values of which are used, or if no ambient pressure sensor is present. In this context the air filter is preferably referred to as defective, if its air permeability is below a predetermined threshold value.

In a further embodiment the load variable is an intake manifold pressure in the intake manifold. This can help the internal combustion engine to be operated precisely. If the load variable is the intake manifold pressure in the intake manifold, the gradients and Y axis segments of the best-fit lines can be interpreted differently from if the load variable is the air mass flow. These different interpretations of results can be determined simply in an empirical manner using a standard automobile industry test bench and can be stored in regression line parameter matrices.

An internal combustion engine (FIG. 1) has an intake system 1, an engine block 2, a cylinder head 3 and an exhaust gas system 4. The intake system 1 preferably has a throttle valve 5, a collector 6 and an intake manifold 7, which leads to a cylinder Z1 via an inlet channel into a combustion chamber 9 of the engine block 2. The engine block 2 also has a crankshaft 8, which is coupled via a connecting rod 10 to a piston 11 of the cylinder Z1. In addition to the cylinder Z1 the internal combustion engine has at least one further cylinder Z2 but preferably a number of further cylinders Z2, Z3, Z4 although it can also have any larger number of cylinders Z1-Z4. The internal combustion engine is preferably disposed in a motor vehicle.

The cylinder head 3 comprises a valve drive 14, 15, which is coupled to a gas inlet valve 12 or a gas outlet valve 13. The valve drive 14, 15 comprises at least one camshaft, which is coupled to the crankshaft 8. Disposed in the cylinder head 3 are also preferably an injection valve 22 and, if the internal combustion engine is not a diesel internal combustion engine, a spark plug 23. The injection valve 22 can alternatively also be disposed in the intake manifold 7. Disposed in the exhaust gas system 4 is an exhaust gas catalytic converter 24, which is preferably configured as a three-way catalytic convertor.

A control facility 25 is provided, to which sensors are assigned, which detect different measured variables and determine the measurement value of the measured variable in each instance. The control apparatus 25 determines manipulated variables as a function of at least one of the measured variables and these are then converted to one or more actuating signals to control the final control elements by means of corresponding actuators. The control apparatus 25 also determines characteristic values of characteristic quantities. The characteristic quantities can be measured variables or variables derived therefrom. The control apparatus 25 can also be referred to as an apparatus for controlling the internal combustion engine and/or as an engine controller.

The sensors are for example a pedal position sensor 26, which detects the position of an accelerator pedal 27, an air mass flow sensor 14, which detects an air mass flow upstream of the throttle valve 5, a temperature sensor 32, which detects an intake air temperature, a throttle valve position sensor 30, which detects a degree of opening of the throttle valve 5, an intake manifold pressure sensor 34, which detects an actual value of an intake manifold pressure in the collector 6, a crankshaft angle sensor 36, which detects a crankshaft angle, to which a rotation speed of the internal combustion engine is then assigned, a lambda probe 38, the measurement signal of which is representative of a ratio of air to fuel in the exhaust gas and an ambient pressure sensor 42 for detecting an air pressure in the area around the internal combustion engine.

Any sub-set of the said sensors or even additional sensors can be present, depending on the embodiment of the invention.

The final control elements are for example the throttle valve 5, the gas inlet and gas outlet valves 12, 13, the injection valve 22 and/or the spark plug 23.

An air filter 40 is also preferably provided in the intake system upstream of the air mass flow sensor 28.

Figure 2:
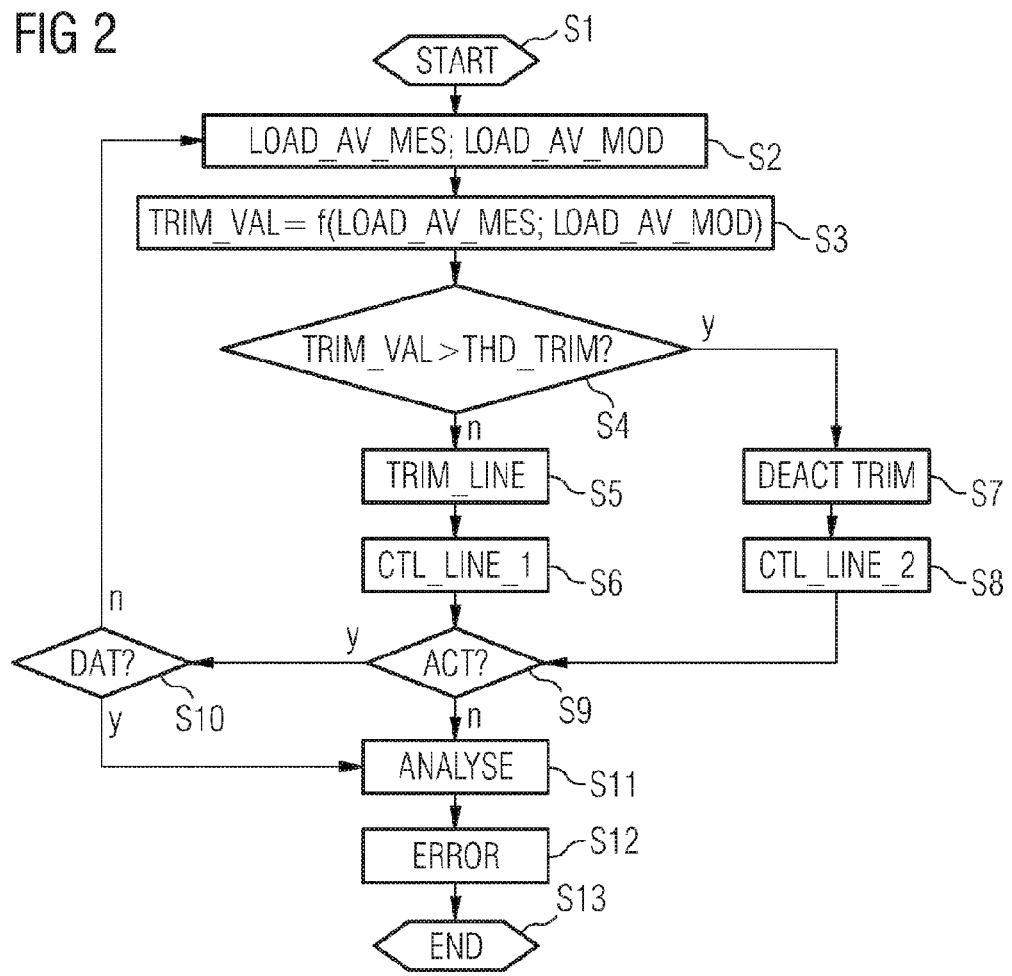
FIG. 2 shows a flow diagram of a program for operating the internal combustion engine.

A program (FIG. 2) for operating the internal combustion engine is preferably stored on a storage medium of the control facility 25. The program serves to determine best-fit functions at different throttle valve pressure ratios PQ as a function of actual values and estimated values of a load variable and as a function of controller deflections of a lambda controller when intake manifold model trimming TRIM is activated and when intake manifold model trimming TRIM is inactive. An error in the intake system 1 can then be identified as a function of the best-fit functions after termination of the program.

The throttle valve pressure ratio PQ is representative of a difference between the intake manifold pressure upstream of the throttle valve 5 and downstream of the throttle valve 5. In this context this signifies that the throttle valve pressure ratio PQ is the relationship between the intake manifold pressure and the ambient pressure.

The intake manifold model serves to determine an estimated value of a load variable, for example an air mass flow flowing into the cylinders Z1-Z4, as a function of at least one of the measured variables, for example as a function of the degree of opening of the throttle valve 5. The intake manifold model is aligned with a load sensor, for example with the air mass flow sensor 28. Alternatively the intake manifold model can be used to determine the intake manifold pressure as a load variable at least as a function of the degree of opening of the throttle valve 5. The load sensor for aligning the intake manifold model is then preferably the intake manifold pressure sensor 34. The intake manifold model can also be referred to as the intake manifold fill model (see the "Handbuch Verbrennungsmotoren" (Internal combustion engine handbook) by van Basshuysen/Schäfer, $2^{nd}$ edition, pages 557 and 558, Vieweg Verlag 2002). The load variable determined by means of the intake manifold model can then be used for example to determine a fuel mass to be metered in.

During operation of the internal combustion engine an actual value LOAD_AV_MES of the load variable is detected with the corresponding sensor and an estimated value LOAD_AV_MOD of the load variable is estimated at the same time by means of the intake manifold model. The detected actual values LOAD_AV_MES and determined estimated values LOAD_AV_MOD of the load variable are compared with one another. At least one model parameter of the intake manifold model is trimmed as a function of the comparison such that the determined estimated values LOAD_AV_MOD of the load variable approximate to the detected actual values LOAD_AV_MES of the load variable. Trimming values TRIM_VAL are representative of a measure of the degree to which the corresponding model parameter of the intake manifold model has to be trimmed to align the intake manifold model. In this context trimming of the model parameter signifies an adjustment of the model parameter. The model parameter for example comprises a reduced cross-sectional surface of the throttle valve 5 for example at low load and/or a pressure upstream of the throttle valve 5 at high load.

The fuel mass metered into the combustion chamber 9 for a combustion process is determined as a function of the estimated values LOAD_AV_MOD or the actual values LOAD_AV_MES of the corresponding load variable.

The program is preferably started at a time close to the time when the internal combustion engine is started in a step S1, in which variables are optionally initialized.

In a step S2 the actual values LOAD_AV_MES of the load variable are preferably detected by means of the load sensor of the internal combustion engine, for example by means of the air mass flow sensor 28, at different throttle valve pressure ratios PQ. The intake manifold model is also used to determine the estimated values LOAD_AV_MOD of the load variable.

In a step S3 trimming values TRIM_VAL are determined as a function of the actual values LOAD_AV_MES of the load variable and the estimated values LOAD_AV_MOD of the load variable. The trimming values TRIM_VAL are representative of the degree to which the corresponding model parameter of the intake manifold model has to be trimmed so that the estimated values LOAD_AV_MOD of the load value approximate to the actual values LOAD_AV_MES of the load variable.

In a step S4 it is verified whether the last determined trimming value TRIM_VAL is greater than a predetermined threshold trimming value THD_TRIM. If the condition of step S4 is not satisfied, processing continues in a step S5. If the condition of step S4 is satisfied, processing continues in a step S7.

In step S5 a trimming value best-fit function is determined as a function of the determined trimming values TRIM_VAL. The trimming value best-fit function is approximated by the trimming values TRIM_VAL. In this context this signifies that the trimming value best-fit function is positioned between the determined trimming values TRIM_VAL such that an overall deviation of all the trimming values TRIM_VAL from the trimming value best-fit function is as small as possible and the trimming value best-fit function does not necessarily go through the trimming values TRIM_VAL. The trimming value best-fit function is also determined as a function of the corresponding throttle valve pressure ratios PQ.

The trimming value best-fit function can comprise a hyperbola or a parabola for example. However the trimming value best-fit function preferably comprises a trimming value best-fit line TRIM_LINE. A trimming value gradient M_T of the trimming value best-fit line TRIM_LINE and a trimming Y axis segment YT of the trimming value best-fit line TRIM_LINE are determined as a function thereof. A modified trimming Y axis segment YT_MOD is also preferably determined as a function of the trimming value gradient M_T and as a function of the trimming Y axis segment YT. The trimming Y axis segment YT is representative of the Y value at which the trimming value best-fit line TRIM_LINE intersects the Y axis, if the Y axis intersects the zero point of the X axis, which is representative of the throttle valve pressure ratios PQ. The modified trimming Y axis segment YT_MOD is representative of the Y value at which the trimming value best-fit line TRIM_LINE intersects the Y axis, if the Y axis intersects the X-axis at one, where the ambient pressure is equal to the intake manifold pressure.

In a step S6 a first controller value best-fit function is determined. The first controller value best-fit function is determined as a function of the throttle valve pressure ratios PQ and is approximated by first controller values of first controller value deflections of the lambda controller. The controller values of the controller value deflections preferably comprise long-term mean values, which are determined for example by low-pass filtering of an I component of the lambda controller. The controller deflections of the lambda controller are representative of the degree to which a mixture ratio of air and fuel must be adjusted so that lambda is equal to one. At lambda equals one the ratio of air and fuel is present as a stoichiometric combustion air ratio, so that all the fuel molecules react fully with the oxygen in the air, without oxygen being absent or uncombusted oxygen remaining. A positive controller value preferably means an increase in the fuel mass relative to a fuel mass precontrol following from the intake manifold fill model. A negative controller value preferably means a reduction in the fuel mass relative to the fuel mass precontrol following from the intake manifold model. The lambda controller is coupled to the lambda probe 38 to set the stoichiometric mixture ratio. The first controller values also comprise only controller values which are detected when intake manifold model trimming TRIM is active. The first controller value best-fit function preferably comprises a first controller value best-fit line CTL_LINE_1. Alternatively or additionally the first controller value best-fit function can also comprise a hyperbola or a parabola. In particular a first controller value gradient M_R1 and a first controller value Y axis segment YR1 of the first controller value best-fit line CTL_LINE_1 are determined. A modified first controller value Y axis segment YR1_MOD is also preferably determined according to the modified trimming Y axis segment.

In a step S7 a deactivation command DEACT is used to deactivate intake manifold model trimming TRIM.

In a step S8 a second controller value best-fit function, preferably a second controller value best-fit line CTL_LINE_2, is determined as a function of the throttle valve pressure ratios PQ. Alternatively or additionally the second controller value best-fit function can also comprise a hyperbola or a parabola. The second controller value best-fit line CTL_LINE_2 is preferably determined in such a manner that it is approximated by the second controller values. The second controller values are second controller deflections of the lambda controller when intake manifold model trimming TRIM is inactive. In other words the first controller values of the lambda controller differ from the second controller values of the lambda controller in that during detection of the first controller values of the lambda controller intake manifold model trimming TRIM is active and during detection of the second controller values of the lambda controller intake manifold model trimming TRIM is inactive. In particular in step 8 a second controller value gradient M_R2 and a second controller value Y axis segment Y_R2 are determined. A modified second controller value Y axis segment YR2_MOD is also preferably determined. The two controller value Y axis segments, like the first controller value Y axis segments, are representative of the y value at which the second controller value best-fit line CTL_LINE_2 intersects the Y axis, if the Y axis intersects the X axis at zero or at one.

In a step S9 an activity check ACT is used to verify whether the internal combustion engine is still active. In other words it is verified whether the internal combustion engine should be turned off, for example because the motor vehicle, in particular the internal combustion engine, is turned off by a driver of the motor vehicle. If the condition of step S9 is satisfied, processing continues in a step S10. If the condition of step S9 is not satisfied, processing continues in a step S11. Alternatively an abort condition can be introduced. The abort condition brings about a jump to step S11 from any one of steps S2 to S8 if the internal combustion engine is turned off.

In step S10 it is verified whether a quantity of data DAT is large enough to allow an analysis ANALYSE of the best-fit functions to be carried out. If the condition of step S10 is satisfied, processing continues in a step S11. If the condition of step S10 is not satisfied, processing continues again in step S2.

In step S11 the analysis ANALYSE of the best-fit functions is carried out. The patterns of the regression line parameter matrices in particular are analyzed in this process.

In a step S12 an error report ERROR is generated, if a corresponding error has been identified during the analysis ANALYSE. Otherwise no error report ERROR is generated. The error report ERROR can be displayed for a user of the internal combustion engine and/or can be stored in an error storage unit of the control facility 25. The error report to be displayed or stored as a function of the best-fit line is described in more detail below based on a number of diagrams and corresponding regression line parameter matrices. Only the regression line parameter matrices and best-fit functions resulting when the intake manifold model is used to determine the estimated value of the air mass flow and when the intake manifold model is aligned by means of the detected actual value of the air mass flow and when the fuel quantity precontrol takes place as a function of the estimated values of the air mass flow are shown here. It is also assumed in the following that the internal combustion engine does not have a turbocharger.

The program can be terminated in a step S13. The program is preferably executed regularly during operation of the internal combustion engine.

Figure 3:
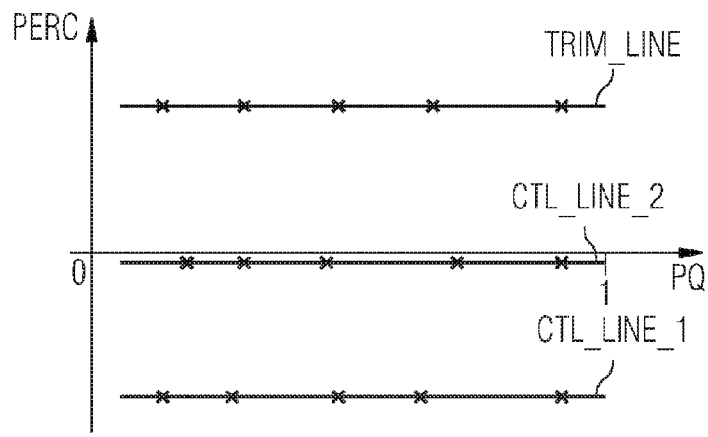
FIG. 3 shows a first diagram and a first regression line parameter matrix.

A first diagram (FIG. 3) comprises an X axis, on which the points between zero and one are representative of the different throttle valve pressure ratios PQ. The Y axis of the first diagram is representative of a percentage PERC, by which the model parameter of the intake manifold model must be trimmed to align the intake manifold model and/or by which the lambda controller must be deflected so that lambda is equal to one. The trimming value best-fit line TRIM_LINE, the first controller best-fit line CTL_LINE_1 and the second controller best-fit line CTL_LINE_2 are shown in the first diagram.

The best-fit lines essentially pass through the values in this and the following illustrations. If the first diagram and/or the following diagrams is/are represented with sufficient accuracy, the individual points on the diagrams can also lie above or below the corresponding best-fit lines. Also the points, the Y values of which are almost or approximately zero, are essentially displaced to some degree in relation to the X axis, so that the corresponding best-fit line can be distinguished from the X axis even in a black and white illustration. In reality the values can essentially be directly on or only minimally displaced in relation to the X axis.

In the first diagram all the best-fit lines are almost horizontal, with the trimming best-fit line TRIM_LINE above the X axis, the first controller value best-fit line CTL_LINE_1 below the X axis and the second controller value best-fit line CTL_LINE_2 almost on the X axis. This shows that the trimming value gradient M_T is approximately zero and the trimming Y axis segment and the modified trimming Y axis segment YT_MOD are greater than zero. The two controller value gradients are also approximately zero. The first controller value Y axis segments are smaller than zero and the second controller value Y axis segment are approximately zero. This means that the air mass flow sensor 28 outputs a greater actual value of the air mass flow than is actually flowing into the intake system 1. Since the air mass flow sensor 28 indicates the higher actual value of the air mass flow than is present, the model parameter of the intake manifold model is adjusted by positive trimming such that the estimated value LOAD_AV_MOD of the load variable, in particular the estimated value of the air mass flow, is raised to the actual value LOAD_AV_MESS of the load variable, in particular to the actual value of the air mass flow. The Y axis segments of the trimming value best-fit line TRIM_LINE are therefore greater than zero. The lower the throttle valve pressure ratio PQ, the more the throttle valve 5 has to be adjusted to achieve a predetermined load change. The horizontal trimming value best-fit line TRIM_LINE is therefore representative of the fact that the error in the load sensor reduces as the throttle valve ratio PQ increases and the error in the air mass flow sensor 28 is thus relative to the throttle valve pressure ratio PQ.

If intake manifold model trimming TRIM is active, the too highly trimmed estimated value of the air mass flow brings about too high a predetermined fuel quantity precontrol metered to the combustion chamber 9 for the combustion process. This is equalized by a constant negative deflection of the lambda controller to ensure stoichiometric combustion. The first controller value gradient M_R1 is therefore approximately zero and the first controller value Y axis segments are smaller than zero. If intake manifold model TRIM is inactive, the estimated value of the air mass flow corresponds very closely to the actual value of the air mass flow. The lambda controller therefore shows no significant deflection at the different throttle valve pressure ratios PQ. Both the second controller value gradient and the second controller value Y axis segments are therefore approximately zero.

The gradients of the best-fit lines and the Y axis segments of the best-fit lines are preferably input in a corresponding regression line parameter matrix, it being sufficient to identify whether the corresponding values are greater, approximately equal to or smaller than zero. The defective air mass flow sensor 28 can then be identified as a function of the pattern of the regression line parameter matrix.

Figure 4:
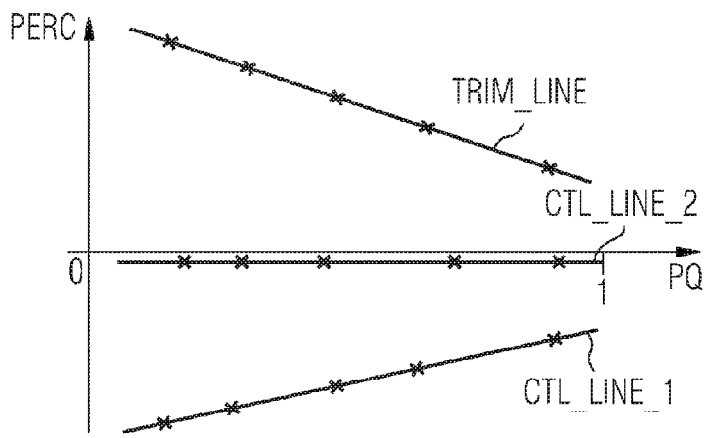
FIG. 4 shows a second diagram and a second regression line parameter matrix.

If the air mass flow sensor 28 always has the same absolute error regardless of the throttle valve pressure ratio PQ, the model parameter must be trimmed less as the throttle valve pressure ratio PQ increases. The lambda controller must also carry out fewer subsequent corrections accordingly, as the fuel quantity precontrol is too high but decreases as the throttle valve pressure ratio PQ increases. This is because at a high throttle valve pressure ratio PQ slight trimming of the model parameter is sufficient to compensate for the absolute load error. The absolute load error can also be referred to as the offset. This produces a second diagram (FIG. 4), the coordinates system of which corresponds to that of the first diagram. Here the trimming value best-fit line TRIM_LINE is greater than zero but it drops as the throttle valve pressure ratio PQ increases and the first controller value best-fit line is smaller than zero as before but increases as the throttle valve pressure ratio PQ increases. When intake manifold model trimming TRIM is deactivated, the modeled estimated value of the air mass flow corresponds very closely as before to the actual air mass flow, with the result that the controller deflections of the lambda controller are only slight and approximately equal to zero. In particular the trimming value gradient M_T is smaller than zero and the trimming Y axis segments are greater than zero. The first controller value gradient M_R1 is greater than zero and the first controller value Y axis segments are smaller than zero. The second controller value gradient M_R2 and the second controller value Y axis segments are approximately zero.

Figure 5:
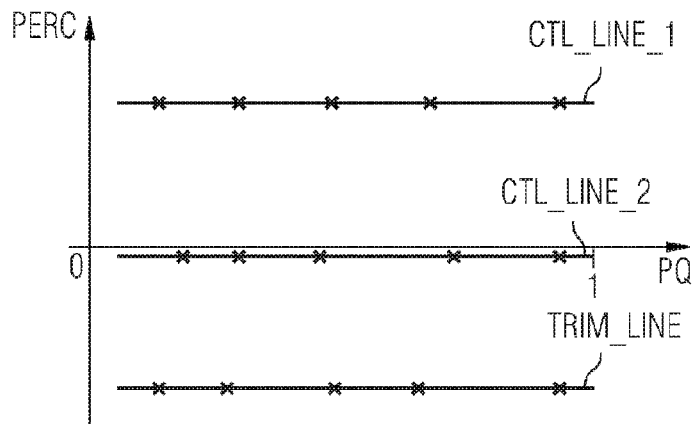
FIG. 5 shows a third diagram and a third regression line parameter matrix.

If the air mass flow sensor 28 detects a lower actual value of the air mass flow than is actually present, the model parameter must be trimmed in a negative direction, which brings about a positive deflection of the lambda controller when intake manifold model trimming TRIM is active. If the load error is relative to the throttle valve pressure ratio PQ, the trimming value best-fit line TRIM_LINE and the first controller value best-fit line CTL_LINE_1 are almost horizontal. This is illustrated in a third diagram (FIG. 5). When intake manifold model trimming TRIM is deactivated, the estimated value of the air mass flow corresponds very closely to the actual value of the air mass flow, so that the controller deflections of the lambda controller are negligible. The gradients of the best-fit lines are then in particular approximately zero. The Y axis segments of the trimming value best-fit line TRIM_LINE are smaller than zero. The Y axis segments of the first controller value best-fit line CTL_LINE_1 are greater than zero and the Y axis segments of the second controller value best-fit line CTL_LINE_2 are approximately zero.

Figure 6:
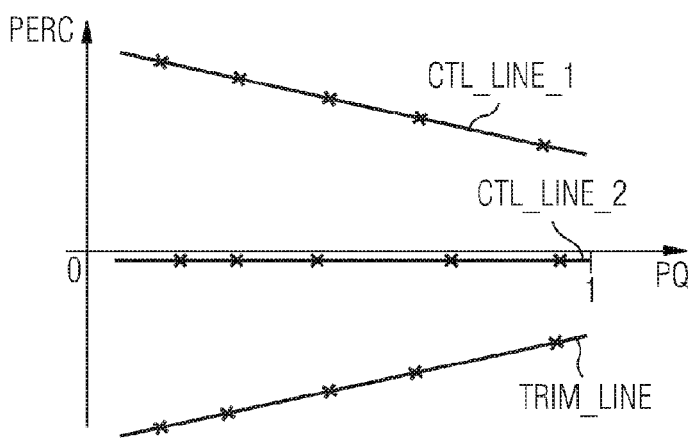
FIG. 6 shows a fourth diagram and a fourth regression line parameter matrix.

If the air mass flow sensor 28 indicates absolutely too little regardless of the throttle valve pressure ratio PQ, the model parameter must be trimmed less as the throttle valve pressure ratio PQ increases, resulting in a decreasing controller value deflection of the lambda controller. This is represented in a fourth diagram (FIG. 6), in which the trimming value best-fit line TRIM_LINE is below the X axis and rises as the throttle valve pressure ratio PQ increases. The first controller value best-fit line CTL_LINE_1 is above the X axis and drops as the throttle valve pressure ratio PQ increases. The second controller value best-fit line CTL_LINE_2 is approximately on the X axis. In particular the trimming value gradient M_T is greater than zero and the trimming Y axis segments are smaller than zero. The first controller value gradient M_R1 is smaller than zero and the first controller value Y axis segments are greater than zero. The second controller value gradient M_R2 and the second controller value Y axis segments are approximately equal to zero.

Figure 7:
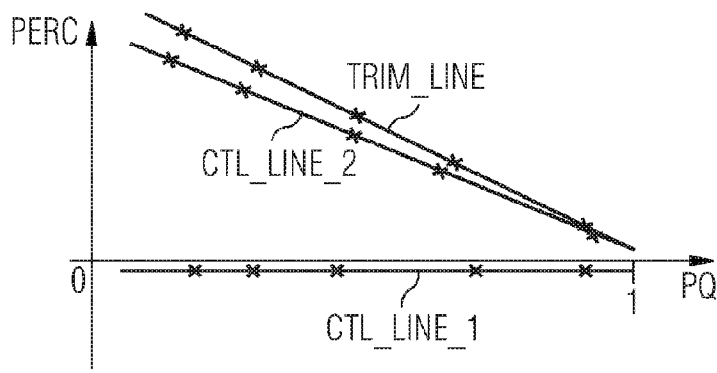
FIG. 7 shows a fifth diagram and a fifth regression line parameter matrix.

It can also be identified whether the degree of opening of the throttle valve 5 is greater than is detected by the throttle valve position sensor 30. In throttled engine operation, in other words at a low throttle valve pressure ratio PQ, greater opening of the throttle valve 5 brings about a greater actual air mass flow than that calculated by means of the intake manifold model. The air mass flow sensor 28 however detects the actual value of the air mass flow correctly and aligns the intake manifold model with the actual value of the air mass flow by means of a positive trimming value TRIM_VAL. As the air mass flow is then correctly determined, the fuel quantity precontrol determined therefrom corresponds to the actual air mass flow and the lambda controller shows no significant deflection. At the low throttle valve pressure ratio PQ the actual air mass flow is almost proportional to the degree of opening of the throttle valve 5. At the high throttle valve pressure ratio PQ an increase in the degree of opening of the throttle valve 5 only brings about a slight increase in the actual air mass flow. Therefore at the low throttle valve pressure ratio PQ the model parameter must be trimmed with a large trimming value TRIM_VAL and at the high throttle valve pressure ratio PQ it must be trimmed with a small positive trimming value TRIM_VAL. If intake manifold model trimming TRIM is inactive, the modeled estimated value of the air mass flow is smaller than the detected air mass flow. Therefore for stoichiometric combustion the lambda controller must have a significant positive deflection in proportion to active intake manifold model trimming TRIM. This produces a fifth diagram (FIG. 7), in which the trimming value best-fit line TRIM_LINE and the second controller value best-fit line CTL_LINE_2 are above the X axis and drop toward the high throttle valve pressure ratio PQ and in which the first controller value best-fit line CTL_LINE_1 is almost zero. In particular the trimming value gradient M_T is smaller than zero, the first trimming Y axis segment YT is greater than zero and the modified first trimming Y axis segment YT_MOD is approximately equal to zero. The first controller value gradient M_R1 and the first controller value Y axis segments are approximately equal to zero. The second controller value gradient M_R2 is smaller than zero, the second controller value Y axis segment YR2 is greater than zero and the second modified controller value Y axis segment YR2_MOD is approximately equal to zero.

As an alternative to the lines a parabola with the form $$U(PQ) = ax\sqrt{PQ-1}$$

can also be approximated by the measurement values. This produces a smaller mean square error in this context.

If the actual degree of opening of the throttle valve 5 always has the same deviation in relation to the detected degree of opening of the throttle valve 5 regardless of the throttle valve pressure ratio PQ, the same regression line parameter matrix results as with the relative error of the degree of opening of the throttle valve 5. However as the error has the same impact for all throttle valve pressure ratios PQ, the trimming value best-fit line TRIM_LINE and the second controller value compensation line CTL_LINE_2 are flatter than with the relative error of the degree of opening of the throttle valve 5.

Figure 8:
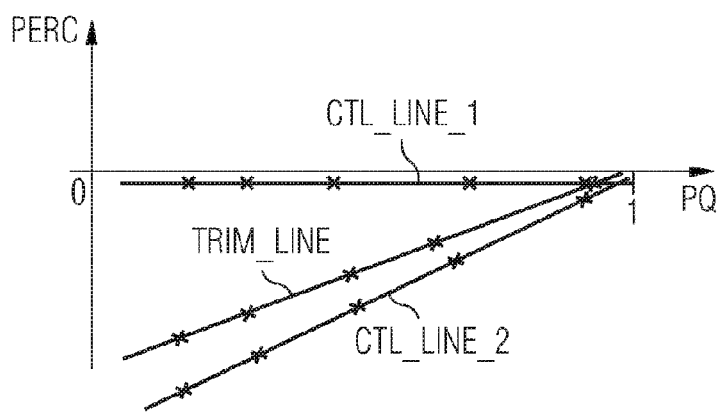
FIG. 8 shows a sixth diagram and a sixth regression line parameter matrix.

If the degree of opening of the throttle valve 5 is smaller than is detected by the throttle valve position sensor 30, the same best-fit lines result as with the error, whereby the degree of opening is greater than detected but with the opposite preceding sign. This produces a sixth diagram (FIG. 8), in which the trimming value best-fit line TRIM_LINE and the second controller value best-fit line CTL_LINE_2 are smaller than zero and increase monotonously. The first controller value best-fit line CTL_LINE_1 almost corresponds to the X axis. In particular the trimming value gradient M_T is greater than zero, the trimming Y axis segment YT is smaller than zero and the modified trimming Y axis segment YT_MOD is approximately zero. The first controller value gradient M_R1 and the first controller value Y axis segments are approximately equal to zero. The second controller value gradient M_R2 is greater than zero, the second controller value Y axis segment Y_R2 is smaller than zero and the modified second controller value Y axis segment Y_R2_MOD is approximately zero.

If the throttle valve 5 is opened too little, the absolute error and the relative error can again be distinguished in that in the case of the absolute error the gradients of the trimming value best-fit line TRIM_LINE and the second controller value best-fit line CTL_LINE_2 are flatter than with the relative error.

As an alternative to the lines a hyperbola with the form $$U(PQ) = ax\frac{1}{PQ}$$

can also be approximated by the measurement values. This produces a smaller mean square error in this context.

Figure 9:
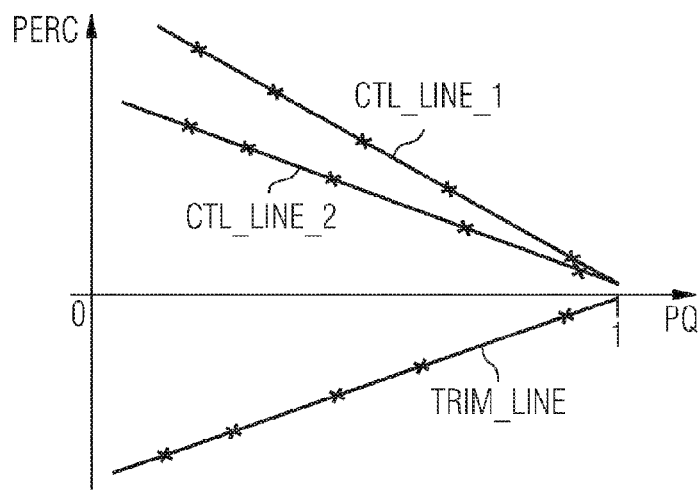
FIG. 9 shows a seventh diagram and a seventh regression line parameter matrix.

If the intake system 1 has a leak, with reduced pressure in the intake system 1 this produces an air mass flow in the intake system 1 which is not detected by the air mass flow sensor 28. Since the actual air mass flow is then greater than the detected air mass flow and the modeled air mass flow, on which the fuel quantity precontrol is based, combustion becomes lean. This is equalized by a positive deflection of the lambda controller. The additional air mass flow into the intake manifold 7 due to the leak brings about a considerable reduction in the actual intake manifold pressure compared with a system without a leak. If the degree of opening of the throttle valve 5 is unchanged and as a result the modeled air mass flow is also unchanged, this causes a reduction in the air mass flow flowing through the air mass flow sensor 28 and being detected correctly there. When intake manifold model trimming TRIM is active, the modeled estimated value of the air mass flow is then reduced to the detected actual value of the air mass flow. If the throttle valve pressure ratio PQ is high, the pressure drop and therefore the unwanted air mass flow via the leak are slight. Therefore the trimming values TRIM_VAL required to align the intake manifold model and the lambda controller deflections required for stoichiometric combustion are likewise slight. As the throttle valve pressure ratio PQ decreases, the pressure drop due to closure of the throttle valve 5 rises. Therefore the unwanted air mass flow via the leak also increases. At the same time as the degree of opening of the throttle valve 5 reduces, the desired air mass flow detected by the air mass flow sensor 28 decreases. Therefore the amounts of the trimming values TRIM_VAL and the lambda controller deflections rise. If intake manifold model trimming TRIM is inactive, the modeled estimated value of the air mass flow is greater than the detected actual value of the air mass flow but smaller than the actual air mass flow. Therefore for stoichiometric combustion the lambda controller must have a significant positive deflection in proportion to the trimming values TRIM_VAL when intake manifold model trimming TRIM is active, the amount of said deflection however being smaller than when intake manifold model trimming TRIM is active. This produces a seventh diagram (FIG. 9), in which the two controller best-fit lines are above the X axis and drop as the throttle valve pressure ratio PQ increases. The trimming value best-fit line TRIM_LINE is below the X axis and increases as the throttle valve pressure ratio PQ increases.

In particular the trimming value gradient M_T is greater than zero, the trimming Y axis segment YT is smaller than zero and the modified trimming Y axis segment YT_MOD is approximately equal to zero. The first controller value gradient M_R1 is smaller than zero, the first controller value Y axis segment YR1 is greater than zero and the modified first controller value Y axis segment YR1_MOD is approximately equal to zero. The second controller value gradient M_R2 is smaller than zero, the second controller value Y axis segment YR2 is greater than zero and the modified second controller value Y axis segment YR2_MOD is approximately equal to zero.

If the leak in the intake system 1 is upstream of the throttle valve 5, the unwanted air mass flow via the leak brings about a rise in the actual pressure upstream of the throttle valve 5 compared with the intake system without a leak. The intake manifold pressure in the intake manifold also rises proportionally thereto. If the degree of opening of the throttle valve 5 is unchanged and as a result the modeled air mass flow is also unchanged, this causes a reduction in the air mass flow flowing through the air mass flow sensor 28 and being detected correctly by it. When intake manifold model trimming TRIM is active, a reduction in the modeled air mass flow to the measured air mass flow is achieved by means of a negative trimming value TRIM_VAL. The throttle valve pressure ratio PQ has no influence on the unwanted air mass flow via the leak. The air mass flow via the leak is only a function of the pressure upstream of the throttle valve 5. A pressure drop at the air filter 40 increases as the air mass flow through the air filter increases, said air filter being coupled to the increasing throttle valve pressure ratio PQ. This brings about a reduction in the pressure upstream of the throttle valve as the throttle valve pressure ratio PQ increases. This brings about a rise in the unwanted air mass flow via the leak as the throttle valve pressure ratio PQ increases. The air mass flows via the leak, the air filter 40 and the air mass flow sensor 28 are thus relatively slight for all throttle valve pressure ratios PQ. The influence of the leak upstream of the throttle valve 5 is thus much smaller than the influence of the leak downstream of the throttle valve 5. The same regression line parameters therefore result in respect of preceding sign but with smaller amounts.

If intake manifold model trimming TRIM is inactive, the modeled estimated value of the air mass flow is greater than the detected actual value of the air mass flow but smaller than the actual air mass flow. For stoichiometric combustion the lambda controller must therefore have a positive deflection in proportion to the trimming values TRIM_VAL when intake manifold model trimming TRIM is active, the amount of said deflection however being smaller than when intake manifold model trimming TRIM is active. The amounts of the trimming values TRIM_VAL and controller values are also smaller compared with the leak downstream of the throttle valve 5 when intake manifold model trimming TRIM is inactive.

Figure 10:
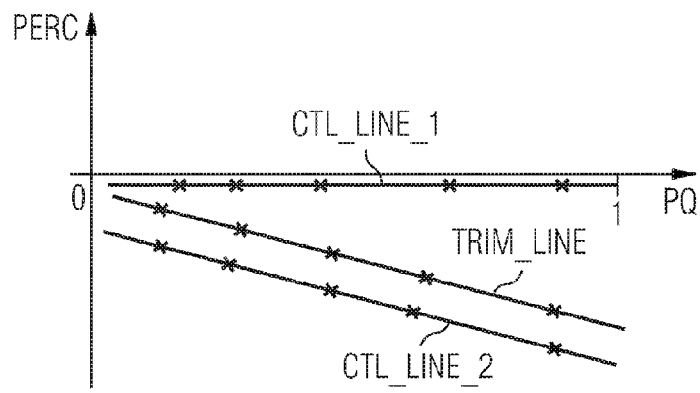
FIG. 10 shows an eighth diagram and an eighth regression line parameter matrix.

If the ambient pressure sensor 42 indicates a higher ambient pressure than is actually present, this results in too high a modeled pressure upstream of the throttle valve 5, which results in too high a modeled estimated value of the air mass flow for a predetermined degree of opening of the throttle valve 5. Therefore when intake manifold model trimming TRIM is active, the modeled air mass flow is reduced to the detected air mass flow by negative trimming values TRIM_VAL. If the throttle valve pressure ratio PQ is supercritical (PQ<0.53), the actual air mass flow is a proportional function of the pressure upstream of the throttle valve 5. Therefore a constant absolute error in the ambient pressure sensor 42 brings about the same constant negative trimming values TRIM_VAL at a supercritical throttle valve pressure ratio PQ. If the throttle valve pressure ratio PQ is subcritical (PQ>0.53), the excessively large determined pressure upstream of the throttle valve 5 brings about an over-proportional rise in the modeled air mass flow. In order to align this modeled air mass flow to align the intake manifold model with the detected air mass flow, larger negative trimming values TRIM_VAL are required than when the throttle valve pressure ratio PQ is supercritical. As the air mass flow is thus determined correctly when intake manifold model trimming TRIM is active, it corresponds to the fuel quantity precontrol determined therefrom and the lambda controller shows no significant deflection. If intake manifold model trimming TRIM is inactive, the modeled air mass flow is greater than the actual air mass flow. The lambda controller therefore shows a significant deflection with an amount that is in proportion to the trimming values TRIM_VAL when intake manifold model trimming TRIM is active. This produces an eighth diagram (FIG. 10), in which the trimming value best-fit line TRIM_LINE and the second controller value best-fit line CTL_LINE_2 are below the X axis and drop as the throttle valve pressure ratio PQ increases. The first controller value best-fit line CTL_LINE_1 is approximately on the X axis. In particular the trimming value gradient M_T and the trimming Y axis segments are smaller than zero, the first controller value gradient M_T and the first controller value Y axis segments are approximately zero and the second controller value gradient M_R2 and the second controller value Y axis segments are smaller than zero.

Figure 11:
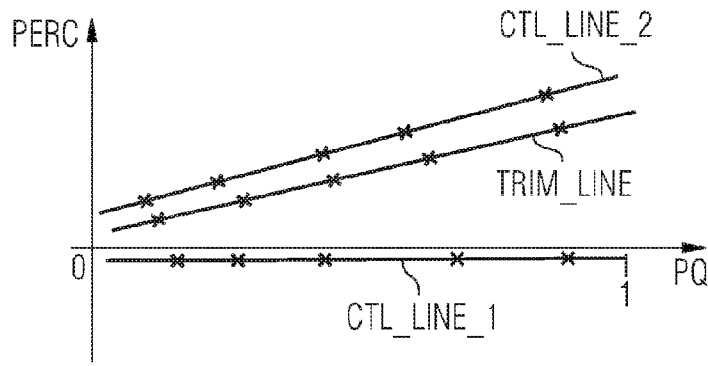
FIG. 11 shows a ninth diagram and a ninth regression line parameter matrix.

If the ambient pressure sensor 42 indicates a lower ambient pressure than is actually present, for the same error deviation this corresponds to the error when the ambient pressure is determined as too high, with the preceding signs of the regression line parameters reversed. This produces a ninth diagram (FIG. 11), in which the trimming value best-fit line TRIM_LINE and the second controller value best-fit line CTL_LINE_2 are above the X axis and rise as the throttle valve pressure ratio PQ increases. The first controller value best-fit line CTL_LINE_1 is approximately on the X axis. In particular the trimming value gradient M_T, the trimming Y axis segments, the second controller value gradient M_R2 and the second controller value Y axis segments are greater than zero and the first controller value gradient M_R1 and the first controller value Y axis segments are approximately equal to zero.

Figure 12:
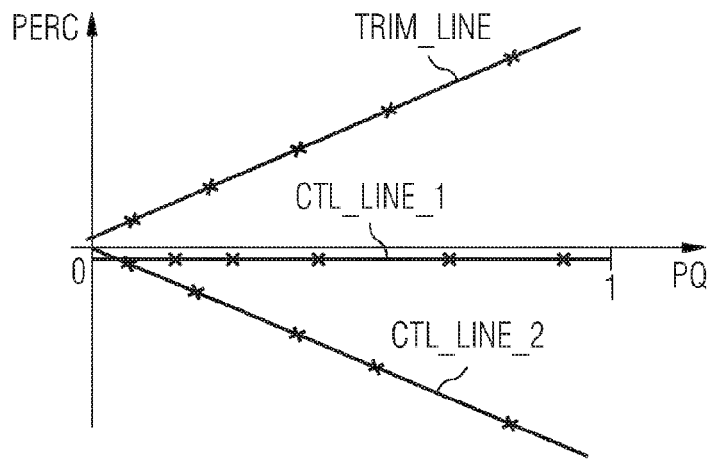
FIG. 12 shows a tenth diagram and a tenth regression line parameter matrix.

If the air filter 40 is non-permeable, for example due to dirt, this can be identified in that the pressure drop across the clean air filter 40 is stored as a characteristic line over the air mass flow, preferably on the storage medium of the control facility 25. It is thus possible to determine the pressure upstream of the throttle valve 5 and downstream of the air filter 40 from a predetermined ambient pressure and the air mass flow for all operating points of the internal combustion engine. If the pressure drop across the air filter 40 for a predetermined air mass flow rises for example due to dirt or icing of the air filter 40, this results in an error in the modeled pressure upstream of the throttle valve 5. In stationary operation before the error is identified, the non-permeable air filter 40 brings about too high a modeled pressure upstream of the throttle valve 5. For a predetermined degree of opening of the throttle valve 5 this results in too high a modeled estimated value of the air mass flow. The modeled air mass flow is reduced to the detected air mass flow by negative trimming values TRIM_VAL and then corresponds to the actual air mass flow. The trimming values TRIM_VAL required to align the intake manifold model are proportional to the air mass flow and therefore proportional to the throttle valve pressure ratio PQ. Since the air mass flow is thus correctly determined when intake manifold model trimming TRIM is active, it corresponds closely to the fuel quantity precontrol determined therefrom and the lambda controller shows no significant deflection. When intake manifold model trimming TRIM is inactive, the modeled air mass flow is greater than the actual air mass flow. The lambda sensor then therefore shows a significant deflection with an amount in proportion to the trimming values TRIM_VAL when intake manifold model trimming TRIM is active. This produces a tenth diagram (FIG. 12), in which the trimming value best-fit line TRIM_LINE is above the X axis and rises as the throttle valve pressure ratio PQ increases. The first controller value best-fit line is approximately on the X axis. The second controller value best-fit line CTL_LINE_2 is below the X axis and drops as the throttle valve pressure ratio PQ increases. In particular the trimming value gradient M_T and the modified trimming Y axis segment YT_MOD are greater than zero and the trimming Y axis segment YT is approximately zero. The first controller value gradient M_R1 and the first controller value Y axis segments are approximately equal to zero. The second controller value gradient M_R2 and the modified second controller value Y axis segment YR2_MOD are smaller than zero and the second controller value Y axis segment YR2 is approximately equal to zero.

If the air filter 40 is non-permeable and the internal combustion engine has no ambient pressure sensor 42, when the ambient pressure is correctly modeled the pressure drop across the air filter 40, which is assumed to be too low, results in a pressure determined as too high upstream of the throttle valve 5. The modeled air mass flow is thus greater than the actual and correctly determined air mass flow and must be reduced to the detected air mass flow by means of negative trimming values TRIM_VAL. In the system wherein the air mass flow is modeled, wherein the fuel mass precontrol is determined as a function of the modeled air mass flow and wherein no ambient pressure sensor 42 is present or at least no measurement signal of the ambient pressure sensor is present, it is assumed that the trimming values TRIM_VAL at full load, in other words at a throttle valve pressure ratio PQ which is approximately 1, are changed from the actual ambient pressure by a deviation of the modeled ambient pressure. As a result the ambient pressure is adapted so that the trimming values TRIM_VAL at full load become almost zero. With the non-permeable air filter 40 the modeled ambient pressure is lower than the actual ambient pressure. The air filter is preferably then classified as non-permeable when a pressure drop across the air filter 40 is greater than a predetermined threshold value.

Figure 13:
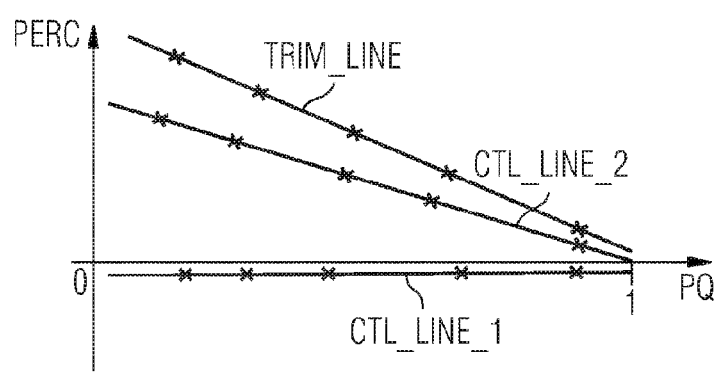
FIG. 13 shows an eleventh diagram and an eleventh regression line parameter matrix.

If at this ambient pressure, which is modeled too low, the internal combustion engine is operated at partial load, in other words the throttle valve pressure ratio PQ is substantially below 1, the pressure drop at the air filter 40, which is modeled too low, is overcompensated by the ambient pressure which is modeled too low. As a result the modeled pressure upstream of the throttle valve 5 is lower than the actual pressure upstream of the throttle valve 5. The modeled air mass flow is thus smaller than the actual air mass flow. The modeled estimated value of the air mass flow is then aligned by means of positive trimming values TRIM_VAL with the detected actual value of the air mass flow. The amounts of the trimming values TRIM_VAL are then proportional to 1-PQ. Since the air mass flow is determined correctly when intake manifold model trimming TRIM is active, it corresponds closely to the fuel quantity precontrol determined therefrom and the lambda controller shows no significant deflection. If intake manifold model trimming TRIM is inactive at the previously adapted ambient pressure, the modeled air mass flow is smaller than the actual air mass flow. The lambda controller therefore shows a significant deflection with an amount in proportion to the trimming values TRIM_VAL when intake manifold model trimming TRIM is active. This produces an eleventh diagram (FIG. 13), in which the trimming value best-fit line TRIM_LINE and the second controller value best-fit line CTL_LINE_2 are above the X axis and drop as the throttle valve pressure ratio PQ increases. The first controller value best-fit line CTL_LINE_1 is approximately on the X axis. In particular the trimming value gradient M_T is smaller than zero, the trimming Y axis segment YT is greater than zero and the modified trimming value Y axis segment YT_MOD is approximately zero. The first controller value gradient M_R1 and the first controller value Y axis segments are approximately equal to zero. The second controller value gradient M_R2 is smaller than zero, the second controller value Y axis segment Y_R2 is greater than zero and the modified second controller value Y axis segment Y_R2_MOD is approximately equal to zero.

The regression line parameter matrix method, which was set out above, can also be used with systems in which the fuel mass precontrol is determined as a function of the detected actual values of the air mass flow. The method can also be used with systems in which estimated values of the intake manifold pressure are determined by means of the intake manifold model and in which the intake manifold model is aligned by means of the modeled estimated values and by means of detected actual values of the intake manifold pressure. The method can also be used with systems in which the fuel mass precontrol takes place as a function of the actual values or estimated values of the intake manifold pressure. The method can also be used with internal combustion engines with turbochargers. The patterns of the regression line parameter matrices, from which the errors can then be identified, must then however be determined on an engine test bench, with the individual errors being simulated and the profiles of the best-fit lines being analyzed. Such engine test benches are used widely in the automobile industry today.

What is claimed is:

1. A method for operating an internal combustion engine with an intake system and an exhaust gas system, which communicate with a combustion chamber of the internal combustion engine as a function of the switching position of a gas inlet valve or gas outlet valve, the intake system has at least an intake manifold and a throttle valve and a load sensor and the exhaust gas system has at least a lambda probe,
the method comprising the steps of:
when intake manifold model trimming is active:
detecting actual values of a load variable by means of the load sensor at different stationary throttle valve pressure ratios, which are representative of a difference between an intake manifold pressure upstream of the throttle valve and downstream of the throttle valve and estimated values of the load variable are also modeled based on an intake manifold model,
determining trimming values of at least one model parameter of the intake manifold model as a function of the detected actual values and the modeled estimated values of the load variable in such a manner that when the corresponding model parameter is trimmed as a function of the trimming values the modeled estimated values of the load variable approximate to the corresponding detected actual values of the load variable,
determining a trimming value best-fit function as a function of the different throttle valve pressure ratios and is approximated by the trimming values,
detecting first controller values of first controller deflections of a lambda controller at different stationary throttle valve pressure ratios, and
determining a first controller value best-fit function as a function of the throttle valve pressure ratios, which is approximated by the first controller values,
when intake manifold model trimming is inactive:
detecting second controller values of second controller deflections of the lambda controller at different stationary throttle valve pressure ratios, and
determining a second controller value best-fit function as a function of the throttle valve pressure ratios, which is approximated by the second controller values, and
identifying an error in the intake system as a function of the best-fit functions.

2. The method according to claim 1, wherein the trimming value best-fit function comprises a trimming value best-fit line and/or wherein the first controller value best-fit function comprises a first controller value best-fit line and/or wherein the second controller value best-fit function comprises a second controller value best-fit line.

3. The method according to claim 2, wherein
the trimming value best-fit line is determined by
a trimming value gradient and a trimming Y axis segment, and/or
the first controller value best-fit line is determined by a first controller value gradient and a first controller value Y axis segment, and/or
the second controller value best-fit line is determined by a second controller value gradient and a second controller value Y axis segment and/or
the error in the intake system is identified as a function of the trimming value gradient, the trimming Y axis segment, the first controller value gradient, the first controller value Y axis segment, the second controller value gradient and/or the second controller value Y axis segment.

4. The method according to claim 3, wherein
a modified trimming Y axis segment is determined as a function of the trimming value gradient and the trimming Y axis segment, and/or
a modified first controller value axis segment is determined as a function of the first controller value gradient and the first controller value Y axis segment, and/or
a modified second controller value Y axis segment is determined as a function of the second controller value gradient and the second controller value Y axis segment,
the error in the intake system is identified as a function of the trimming value gradient, the trimming Y axis segment, the modified trimming Y axis segment, the first controller value gradient, the first controller value Y axis segment, the modified first controller value Y axis segment, the second controller value gradient, the second controller value Y axis segment and/or the modified second controller value Y axis segment.

5. The method according to claim 1, wherein
the trimming values of the load variable are monitored by comparing the trimming values with a predetermined threshold trimming value,
intake manifold model trimming is deactivated and the second controller values of the second controller deflections of the lambda controller are determined, if at least one of the trimming values is greater than the predetermined threshold trimming value.

6. The method according to claim 1, wherein the load variable is an air mass flow upstream of the throttle valve.

7. The method according to claim 6, wherein an error in an air mass flow sensor provided to detect an actual value of the air mass flow is identified if
the gradients of the best-fit lines are approximately zero, the trimming Y axis segments are greater than zero, the first controller value Y axis segments are smaller than zero and the second controller value Y axis segments are approximately zero, or
the trimming value gradient is smaller than zero, the trimming Y axis segments are greater than zero, the first controller value gradient is greater than zero, the first controller value Y axis segments are smaller than zero, the second controller value gradient is approximately zero and the second controller value Y axis segments are approximately zero, or
the gradients of the best-fit lines are approximately zero, the trimming Y axis segments are smaller than zero, the first controller value Y axis segments are greater than zero and the second controller value Y axis segments are approximately zero, or
the trimming value gradient is greater than zero, the trimming Y axis segments are smaller than zero, the first controller value gradient is smaller than zero, the first controller value Y axis segments are greater than zero, the second controller value gradient is approximately zero and the second controller value Y axis segments are approximately zero.

8. The method according to claim 6, wherein an error in the throttle valve is identified, if
the trimming value gradient is smaller than zero, the trimming Y axis segment is greater than zero, the modified trimming Y axis segment is approximately zero, the first controller value gradient and the first controller value Y axis segments are approximately zero, the second controller value gradient is smaller than zero, the second controller value Y axis segment is greater than zero and the modified second controller value Y axis segment is approximately zero,
the trimming value gradient is greater than zero, the trimming Y axis segment is smaller than zero, the modified trimming Y axis segment is approximately zero, the first controller value gradient and the first controller value Y axis segments are approximately zero, the second controller value gradient is greater than zero, the second controller value Y axis segment is smaller than zero and the modified second controller value Y axis segment is approximately zero.

9. The method according to claim 6, wherein a leak in the intake system is identified, if the trimming value gradient is greater than zero, the trimming Y axis segment is smaller than zero, the modified trimming Y axis segment is approximately zero, the first controller value gradient is smaller than zero, the first controller value Y axis segment is greater than zero, the modified first controller value Y axis segment is approximately zero, the second controller value gradient is smaller than zero, the second controller value Y axis segment is greater than zero and the modified second controller value Y axis segment is approximately zero.

10. The method according to claim 6, wherein an error is identified in an ambient pressure sensor, as a function of the measurement value of which the throttle valve pressure ratios are determined, if
the trimming value gradient and the trimming Y axis segments are smaller than zero, the first controller value gradient and the first controller value Y axis segments are approximately zero and the second controller value gradient and the second controller value Y axis segments are smaller than zero, or
the trimming value gradient and the trimming Y axis segments are greater than zero, the first controller value gradient and the first controller value Y axis segments are approximately zero and the second controller value gradient and the second controller value Y axis segments are greater than zero.

11. The method according to claim, wherein a defective air filter of the intake system is identified, if
the trimming value gradient is greater than zero, the trimming Y axis segment is approximately zero and the modified trimming Y axis segment is greater than zero, the first controller value gradient and the first controller value Y axis segments are approximately zero, the second controller value gradient is smaller than zero, the second controller value Y axis segment is approximately zero and the modified second controller value Y axis segment is smaller than zero, or
the trimming value gradient is smaller than zero, the trimming Y axis segment is greater than zero and the modified trimming Y axis segment is approximately zero, the first controller value gradient and the first controller value Y axis segments are approximately zero, the second controller value gradient is smaller than zero, the second controller value Y axis segment is greater than zero and the modified second controller value Y axis segment is approximately zero.

12. The method according to claim 1, wherein the load variable is an intake manifold pressure in the intake manifold.

13. A device for operating an internal combustion engine, comprising an intake system and an exhaust gas system, which communicate with a combustion chamber of the internal combustion engine as a function of the switching position of a gas inlet valve or a gas outlet valve (13), the intake system comprising at least an intake manifold and a throttle valve and a load sensor and the exhaust gas system comprising at least a lambda probe, the device being configured when intake manifold model trimming is active:
to detect actual values of a load variable by means of the load sensor at different stationary throttle valve pressure ratios, which are representative of a difference between an intake manifold pressure upstream of the throttle valve and downstream of the throttle valve and to model estimated values based on an intake manifold model;
to determine trimming values of at least one model parameter of the intake manifold model as a function of the detected actual values and the modeled estimated values of the load variable in such a manner that when the corresponding model parameter is trimmed as a function of the trimming values the modeled estimated values of the load variable approximate to the corresponding detected actual values of the load variable,
to determine a trimming value best-fit function as a function of the different throttle valve pressure ratios which is approximated by the trimming values,
to detect first controller values of first controller deflections of a lambda controller at different stationary throttle valve pressure ratios, and
to determine a first controller value best-fit function as a function of the throttle valve pressure ratios, which is approximated by the first controller values,
when intake manifold model trimming is inactive:
to detect second controller values of second controller deflections of the lambda controller at different stationary throttle valve pressure ratios, and
to determine a second controller value best-fit function as a function of the throttle valve pressure ratios, which is approximated by the second controller values, and the device being further configured
to identify an error in the intake system as a function of the best-fit functions.

14. The device according to claim 13, wherein the trimming value best-fit function comprises a trimming value best-fit line and/or wherein the first controller value best-fit function comprises a first controller value best-fit line and/or wherein the second controller value best-fit function comprises a second controller value best-fit line.

15. The device according to claim 14, wherein
the trimming value best-fit line is determined by a trimming value gradient and a trimming Y axis segment, and/or
the first controller value best-fit line is determined by a first controller value gradient and a first controller value Y axis segment, and/or
the second controller value best-fit line is determined by a second controller value gradient and a second controller value Y axis segment and/or
the error in the intake system is identified as a function of the trimming value gradient, the trimming Y axis segment, the first controller value gradient, the first controller value Y axis segment, the second controller value gradient and/or the second controller value Y axis segment.

16. The device according to claim 15, wherein
a modified trimming Y axis segment is determined as a function of the trimming value gradient and the trimming Y axis segment, and/or
a modified first controller value Y axis segment is determined as a function of the first controller value gradient and the first controller value Y axis segment, and/or
a modified second controller value Y axis segment is determined as a function of the second controller value gradient and the second controller value Y axis segment,
the error in the intake system is identified as a function of the trimming value gradient, the trimming Y axis segment, the modified trimming Y axis segment, the first controller value gradient, the first controller value Y axis segment, the modified first controller value Y axis segment, the second controller value gradient, the second controller value Y axis segment and/or the modified second controller value Y axis segment.

17. The device according to claim 13, wherein
the trimming values of the load variable are monitored by comparing the trimming values with a predetermined threshold trimming value,
intake manifold model trimming is deactivated and the second controller values of the second controller deflections of the lambda controller are determined, if at least one of the trimming values is greater than the predetermined threshold trimming value.

18. The device according to claim 13, wherein the load variable is an air mass flow upstream of the throttle valve.

19. The device according to claim 18, wherein an error in an air mass flow sensor provided to detect an actual value of the air mass flow is identified if
the gradients of the best-fit lines are approximately zero, the trimming Y axis segments are greater than zero, the first controller value Y axis segments are smaller than zero and the second controller value Y axis segments are approximately zero, or
the trimming value gradient is smaller than zero, the trimming Y axis segments are greater than zero, the first controller value gradient is greater than zero, the first controller value Y axis segments are smaller than zero, the second controller value gradient is approximately zero and the second controller value Y axis segments are approximately zero, or
the gradients of the best-fit lines are approximately zero, the trimming Y axis segments are smaller than zero, the first controller value Y axis segments are greater than zero and the second controller value Y axis segments are approximately zero, or
the trimming value gradient is greater than zero, the trimming Y axis segments are smaller than zero, the first controller value gradient is smaller than zero, the first controller value Y axis segments are greater than zero, the second controller value gradient is approximately zero and the second controller value Y axis segments are approximately zero.

20. The device according to claim 18, wherein an error in the throttle valve is identified, if
the trimming value gradient is smaller than zero, the trimming Y axis segment is greater than zero, the modified trimming Y axis segment is approximately zero, the first controller value gradient and the first controller value Y axis segments are approximately zero, the second controller value gradient is smaller than zero, the second controller value Y axis segment is greater than zero and the modified second controller value Y axis segment is approximately zero,
the trimming value gradient is greater than zero, the trimming Y axis segment is smaller than zero, the modified trimming Y axis segment is approximately zero, the first controller value gradient and the first controller value Y axis segments are approximately zero, the second controller value gradient is greater than zero, the second controller value Y axis segment is smaller than zero and the modified second controller value Y axis segment is approximately zero.

* * * * *